United States Patent [19]
Fawcett

[11] 3,710,267
[45] Jan. 9, 1973

[54] ENVELOPE RATE DEMODULATOR

[75] Inventor: James W. Fawcett, East Syracuse, N.Y.

[73] Assignee: General Electric Company, Syracuse, N.Y.

[22] Filed: May 5, 1970

[21] Appl. No.: 34,669

[52] U.S. Cl. ..................329/192, 307/235, 328/151, 329/168
[51] Int. Cl. .............................................H03c 1/06
[58] Field of Search......329/192, 168, 169, 170, 101, 329/173; 307/235; 328/115, 151

[56] References Cited

UNITED STATES PATENTS

| | | | |
|---|---|---|---|
| 3,154,749 | 10/1964 | Perkins | 329/169 |
| 3,350,643 | 10/1967 | Webb | 328/151 X |
| 2,719,225 | 9/1955 | Morris | 329/173 X |
| 3,378,779 | 4/1968 | Priddy | 329/169 X |
| 3,430,227 | 2/1969 | Hillis | 328/151 X |
| 3,482,174 | 12/1969 | James | 329/101 |
| 3,503,049 | 3/1970 | Gilbert et al. | 328/151 X |

*Primary Examiner*—Alfred L. Brody
*Attorney*—Marvin A. Goldenberg, Richard V. Lang, Frank L. Neuhauser, Oscar B. Waddell and Joseph B. Forman

[57] ABSTRACT

A demodulator circuit for extracting the time rate of change of the envelope of an amplitude modulated waveform, having particular application to closed loop control systems, for example, where the derived information is employed for a stabilization of an inertial platform. The envelope rate information is extracted directly from the amplitude modulated waveform by performing an integration of the waveform over an integral number of cycles of the carrier frequency, the residual integrated output providing a measure of the envelope's time rate of change.

5 Claims, 4 Drawing Figures

INVENTOR:
JAMES W. FAWCETT,
BY Marvin [signature]
HIS ATTORNEY.

INVENTOR:
JAMES W. FAWCETT,
BY Marvin L. Goldenberg
HIS ATTORNEY.

ENVELOPE RATE DEMODULATOR

BACKGROUND OF THE INVENTION

1. Field of the invention

The invention relates to the field of amplitude modulation demodulators, and more specifically to their use in closed loop control systems wherein the derivative of the modulation signal is of special interest.

2. Description of the prior art

In control systems, such as employed for inertial platform stabilization and the like, the feedback signal may be generated as an amplitude modulated waveform wherein the modulation signal represents platform position and its derivative represents platform velocity. Where it is a requirement to effect a control as a function of velocity, a signal proportional to the derivative of the modulation signal must be obtained. One known approach is to use conventional means to rectify the carrier and to filter the rectified signal, having a filter transfer characteristic that initially increases linearly with frequency to effect envelope differentiation and then decreases linearly with frequency in order to attenuate the carrier. Processing of the information in this manner has been found to be unsatisfactory for the following reasons: (1) the envelope differentiation process is distorted because of the decreasing transfer characteristic at high frequencies; (2) the carrier cannot for most applications be adequately attenuated by the decreasing transfer characteristics; and (3) the filtering process develops an excessive amount of phase variation which makes application to a closed loop system difficult. Reducing the carrier frequency does not necessarily reduce noise content in the output since this causes ripple in the output signal to increase. On the other hand, narrowing the increasing portion of the transfer characteristics tends to distort the differentiation process. Thus, conflicting constraints are found to be present for which a satisfactory compromise is not readily achieved.

Another known approach for obtaining a signal that is proportional to velocity is to employ an accelerometer device for generating an electrical signal which is a function of the acceleration to which said platform may be subject. In order to derive velocity information, the acceleration signal must be passed through an integration network. The limitation with respect to this approach is that it must be made with high precision and are therefore expensive devices. Further, most present day accelerometers introduce considerable inertia, which may limit the response of the system.

SUMMARY OF THE INVENTION

It is accordingly an object of the present invention to provide a novel envelope rate demodulator which in response to an amplitude modulated waveform generates signal that is a function of the time rate of change of the envelope with high accuracy and in a single functional step.

It is a further object of the invention to provide a novel envelope demodulator as above described which does not require a discrete differentiating function to be performed.

It is another object of the invention to provide a novel envelope rate demodulator as described which is of a relatively simple and inexpensive construction.

These and other objects of the invention are accomplished by an envelope rate demodulator circuit which, in general, extracts the time rate of change of the envelope of an amplitude modulated waveform by performing sequential integrations of sampled portions of said waveform. By including an integral number of cycles of the waveform's high frequency component within each sampled portion, the integrated quantities will for each sample provide a measure of the average time rate of change of the corresponding envelope segment. By providing an equal or consistent phasing of the high frequency components from one sample to another, the integrated quantities can be combined in the output to provide a continuous computation of envelope time rate of change information.

More specifically, the present envelope rate demodulator includes a pair of integrating networks and first switching means for alternately applying the input amplitude modulated waveform to said integrator networks for brief sample periods, said integrating networks generating electrical quantities proportional to the integrated values of the samples. Second switching means alternately connects the integrating networks to buffer means which combines the generated electrical quantities and applies them to an output. There is further included a discharge network and third switching means for discharging the integrating networks so as to prepare them for subsequent samples.

BRIEF DESCRIPTION OF THE DRAWING

The specification concludes with claims particularly pointing out and distinctly claiming the subject matter which is regarded as the invention. It is believed, however, that both as to its organization and method of operation, together with further objects and advantages thereof, the invention may be best understood from the description of the preferred embodiments, taken in connection with the accompanying drawings in which:

DESCRIPTION OF THE PREFERRED EMBODIMENT

Figure 1:
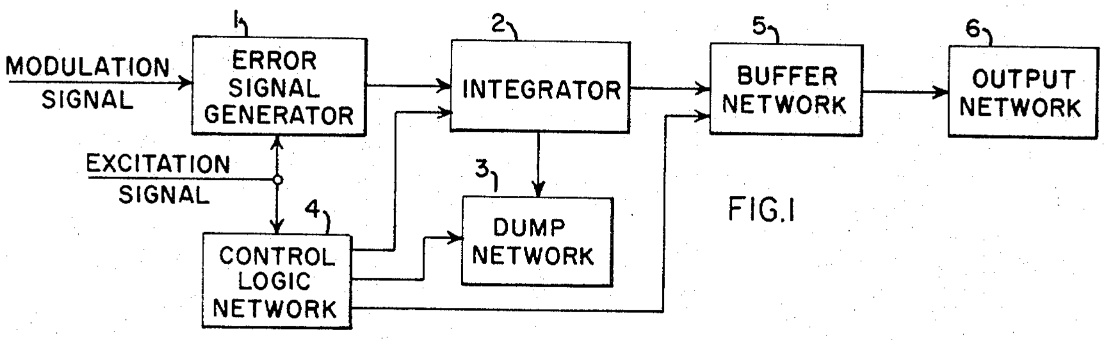
FIG. 1 is a block diagram of an envelope rate demodulation system, in accordance with the present invention.

Referring now to FIG. 1, there is illustrated in block diagram form an envelope rate demodulation circuit configured in accordance with the invention, for extracting the time rate of change of the envelope of an amplitude modulated waveform. In one exemplary application the extracted information represents velocity error of an object whose motion is to be controlled or suppressed, such as an inertial platform or the like, and is employed in the feedback of a closed loop control system for nulling out said error.

The rate demodulation circuit is seen to comprise an error signal generating network 1; an integrator 2 to which said error signal is applied as the input; a discharge or dump network 3 for emptying the contents of the integrator 2; a control logic network 4 which is a source of timing signals for the operation of the overall circuit; a buffer network 5 from which the demodulated signal is obtained; and an output network 6 which is responsive to the demodulator signal. A modulation signal E($t$), which in the example referred to may represent a changing position as a function of time of a given object, is applied as a first input to the error signal generator network 1 for modulating a relatively high frequency excitation signal applied as a second input to generator 1. The excitation signal frequency may be typically 5 – 10 KHz. The output of block 1 is therefore an amplitude modulated waveform E($t$) sin $\omega_o t$ applied to the integrator 2, where $\omega_o$ is the frequency of the excitation signal. Regarding the waveform E($t$) sin $\omega_o t$, the carrier may be suppressed or present. Where the modulation signal E($t$) is required to have both positive and negative values a suppressed carrier amplitude modulated waveform must be generated for preserving sign. The modulation signal E($t$) may be derived from transducer means of conventional form, and the excitation signal from a conventional reference generator. The error generating network 1 may be typically in the form of a resolver or microsyn.

The integrator 2 has a first output connected to the buffer network 5 and a second output connected to the dump network 3. The control logic network 4 is connected to the integrator, dump and buffer means for controlling the timing of their operations. The network 4 preferably operates in response to the excitation signal so that the timing signals can be readily synchronized to the excitation frequency. Accordingly, in response to a sequence of timing signals from network 4 a sampled portion of the amplitude modulated waveform E($t$) sin $\omega_o t$ comprising an integral number of cycles of the high frequency components is integrated. The residual quantity representing an average rate of change of the corresponding envelope segment or the time rate of change in the middle of the sample, is coupled through the buffer network 5 to the output network 6. The dump network 3 clears the integrator 2 so that the process can be repeated and subsequent samples integrated. There is accordingly supplied to the output network 6 a sequence of electrical quantities, typically in the form of a voltage, which provide a measure of the envelope time rate of change.

That the integrated value of an integral number of cycles of the high frequency component of an amplitude modulated waveform is proportional to the average time rate of change of the corresponding envelope segment can be demonstrated by the following considerations. If it is assumed that a sample contains one cycle of said high frequency component, and that the time rate of change of the envelope segment change only slightly over a sample period, then the envelope segment during the $k^{th}$ sample period, $E_k(t)$ may be approximated the quadratic equation:

$$E_k(t) = A_k + B_k t + C_k t^2 \quad (1)$$

for the condition $$|t - t_k| \leq 2\pi/\omega_o \quad (2)$$

where $A_k$, $B_k$ and $C_k$ are constants, $t_k$ is some fixed time within the sample period.

The slope of the envelope segment $E_k(t)$ is expressed as:

$$\dot{E}_k(t) = B_k + 2C_k t \quad (3)$$

The slope at $t_k$ is expressed as:

$$\dot{E}_k(t_k) = B_k + 2C_k t_k \quad (4)$$

For $t_k = kT = k(2\pi)/(\omega_o)$ $$\dot{E}_k(t_k) = B_k + (4k\pi)/(\omega_o)\, C_k \quad (5)$$

Considering the output of the rate demodulator for $k^{th}$ sample period, it may be expressed as:

$$V_k = \int_{t_k - T/2}^{t_k + T/2} (A_k + B_k t + C_k t^2) \sin \omega_o t\, dt \quad (6)$$

where T is the sample period.

Carrying out the integration it is found that $$V_k = \frac{2\pi}{\omega_o^2}\left(B_k + \frac{4k\pi}{\omega_o} C_k\right) = \frac{2\pi}{\omega_o^2} \dot{E}_k(t_k) \quad (7)$$

Thus the rate demodulator output is directly proportional to the envelope time rate of change.

Figure 2:
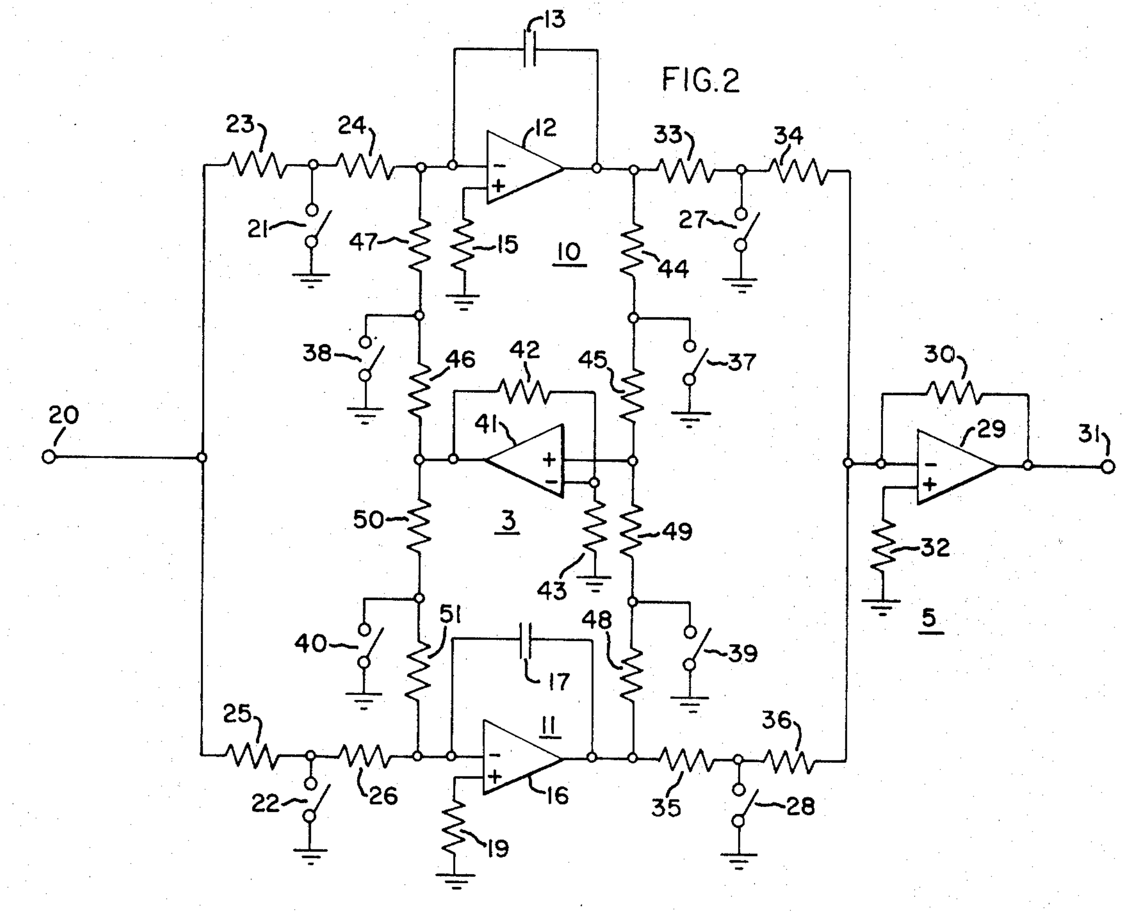
FIG. 2 is a schematic circuit diagram of the envelope rate demodulator components of FIG. 1.

In FIG. 2 there is a schematic circuit diagram which illustrates in greater detail the integrator, dump and buffer means of the envelope rate demodulator of FIG. 1, in accordance with one specific embodiment of the invention. In this embodiment the integration process is performed in two out of phase time sequences wherein the integrator means is composed of a first integrating network 10 and a second integrating network 11 which are operated in an alternate manner. The network 10 is in the form of an operational amplifier comprising an amplifier component 12 having a positive and negative input terminal and an output terminal. A feedback path between the output terminal and the negative input terminal includes a capacitor 13. A bias resistor 15 is connected from the positive input terminal to ground. Similarly, the network 11 is in the form of an operational amplifier comprising an amplifier component 16 and a capacitor 17 in the feedback path between the amplifier output terminal and its negative input terminal. A bias resistor 19 is connected between the positive input terminal and ground.

An amplitude modulated waveform E($t$) sin $\omega_o t$ is applied to an input terminal 20 of the rate demodulator from the error signal generating network as shown in FIG. 1. First switching means, including a first switching device 21 and a second switching device 22, couple the amplitude modulated waveform to the integrating networks 10 and 11. The input terminal 20 is connected through the series arrangement of resistors 23 and 24 to the negative input terminal of amplifier component 12, the junction of resistors 23 and 24 being connected through switching device 21 to ground. Terminal 20 is further connected through the serial arrangement of resistors 25 and 26 to the negative input terminal of amplifier component 16, the junction of resistors 25 and 26 being connected through switching device 22 to ground. The alternate operation of switches 21 and 22 alternately connect the amplitude modulated waveform to the integrating networks 10 and 11. Switches 21 and 22, as well as the other circuit switches, are functionally represented by mechanical symbology. In practice they will normally be electronic devices, such as field effect transistors driven by logic signals derived from the excitation signal.

Second switching means, including a third switching device 27 and a fourth switching device 28, couple the integrated values generated by the integrating networks 10 and 11 to the buffer network 5. The buffer network 5 is in the form of an operational amplifier composed of an amplifier component 29 and a feedback resistor 30 connected between the amplifier component's output terminal and its negative input terminal. The component's output terminal being joined to the rate demodulator circuit output 31. The positive input terminal of component 29 is connected through a bias resistor 32 to ground. The output terminal of component 12 is connected through the series arrangement of resistors 33 and 34 to the negative input terminal of the component 29, the junction of resistors 33 and 34 being connected through switch 27 to ground. Similarly, the output terminal of amplifier component 16 is connected through the serial arrangement of resistors 35 and 36 to the negative input terminal of component 29, the switch 28 connecting the junction of resistors 35 and 36 to ground. The alternate operation of switches 27 and 28 alternately connect the integrated values of networks 11 and 12 to the buffer network 5. The network 5 serves to buffer the networks 11 and 12 from the load by presenting at its input a fixed impedance that is independent of the load, as well as to combine the integrating quantities applied thereto.

Finally a third switching means are provided for alternately connecting the discharge network 3 to the integrating networks 10 and 11, said third switching means including a first pair of switching devices 37 and 38 for connecting the discharge network 3 to the integrating network 10 and a second pair of switching devices 39 and 40 for connecting the discharge network 3 to the integrating network 11. The discharge network 3 is also an operational amplifier including an amplifier component 41 and a feedback resistor 42 connected between the component's output terminal and its negative input terminal, the negative input terminal also being connected through a bias resistor 43 to ground. The output terminal of component 12 is connected through series resistors 44 and 45 to the positive input terminal of component 41, the junction of resistors 44 and 45 being connected through switch 37 to ground. The output terminal of component 41 is connected through series resistors 46 and 47 to the negative input terminal of component 12, the junction of resistors 46 and 47 being connected through switch 38 to ground. Correspondingly, the output terminal of component 16 is connected through series resistors 48 and 49 to the positive input terminal of component 41, the junction of resistors 48 and 49 being connected through switch 39 to ground, and the output terminal of component 41 is connected through series resistors 50 and 51 to the negative input terminal of component 16, the junction of resistors 50 and 51 being connected through switch 40 to ground. Thus, the active feedback connection is provided for accomplishing rapid discharge of the integrating network capacitors.

As will now be described in detail the various switching devices are operated in first and second repetitive time sequences so as to provide an alternate integration of sampled portions of the applied amplitude modulated waveform. Thus, the switching devices of the circuit together with the discharge network 3 provide sampling of the amplitude modulated waveform. To perform rate demodulation each sample includes one or more complete cycles, commencing at a zero crossover region, of the high frequency component of said waveform. The sampling being performed in a synchronous manner. The time sequential operation of the switches is determined by timing signals applied to said switches from the control logic network 4, illustrated in FIG. 1. The timing signals applied to the various switches are illustrated by graphs A through F in FIG. 3.

Figure 4:
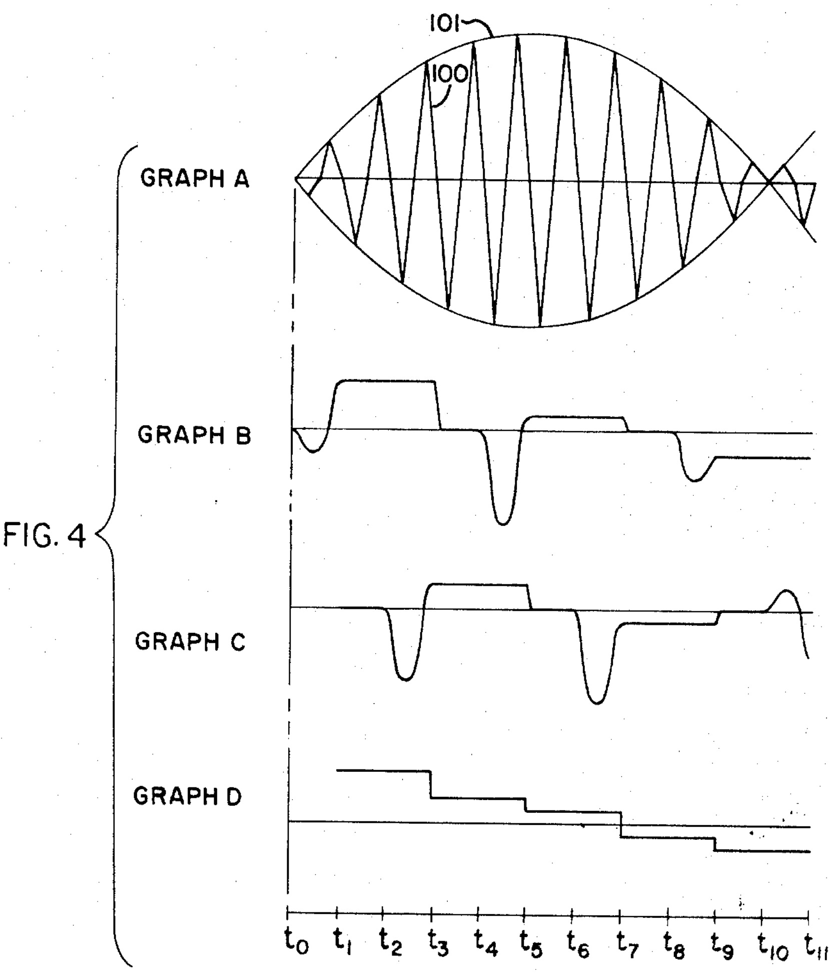
FIG. 4 is a series of waveforms used to explain the operation of the FIG. 2 circuitry.

Considering an exemplary operation of the circuit of FIG. 2, a suppressed carrier amplitude modulated waveform such as shown in Graph A of FIG. 4 may be applied to the input terminal 20. This waveform has a high frequency component 100 and an amplitude modulation low frequency component represented by the envelope 101. The high frequency component 100 may be considered to be in phase with the excitation signal for the first several cycles, reversing phase at $t_{10}$ as the envelope goes through zero. The envelope is seen to be a nonlinear function having a positive slope for the first half of the waveform and a negative slope for the second half of the waveform. In a first repetitive time sequence of switching events which occur between times $t_0$ and $t_4$, $t_4$ and $t_8$ etc., sampled portions of the applied waveform are integrated by integrating network 10 and the residual integrated quantities coupled through buffer network 5 to the output. In a second repetitive time sequence of switching events, out of phase with the first, which occur between times $t_2$ and $t_6$, $t_6$ and $t_{10}$, etc., second sampled portions of the amplitude modulated waveform are integrated by network 11 and coupled through buffer 5 to the output.

Figure 3:
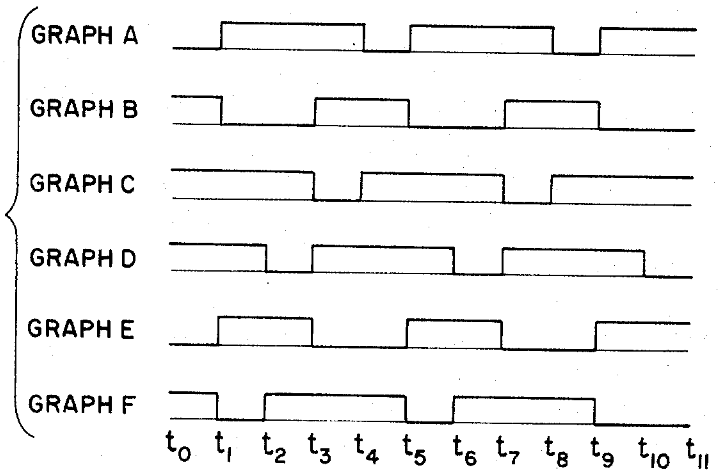
FIG. 3 is a series of graphs employed in a description of the operation of the FIG. 2 circuitry.

Referring to the first time sequence, between $t_0$ and $t_1$ a timing signal is applied to switch 21, shown by Graph A of FIG. 3, which opens the switch and applies one complete cycle of the high frequency component of the amplitude modulated waveform to the integrating network 10. During this period timing signals are applied to switches 27, 37 and 38, which close these switches and effectively isolate network 10 from the buffer and discharge networks. The timing signal to switch 27 is shown in Graph B of FIG. 3, and the timing signal applied jointly to switches 37 and 38 is shown in Graph C of FIG. 3. Accordingly, during this sample period integration of the sample is performed by the network 10, as shown by Graph B of FIG. 4. At $t_1$ switch 21 is closed and switch 27 opened. The residual electrical quantity at the end of the sample period is proportional to the integrated value of the sample and provides a measure of the average time rate of change of the corresponding envelope segments. During a holding period $t_1$ through $t_3$ the residual electrical quantity in network 10 is applied through the buffer network 5 to the output terminal 31, the output voltage being illustrated in Graph D of FIG. 4. At $t_3$ switch 27 is again closed and switches 37 and 38 are opened for discharging the residual electrical quantity in integrating network 10 through the discharge network 3, thereby readying the network 10 for a subsequent sample. The first timing sequence is repeated at $t_4$ with the same switching events again occurring for integrating a second sample and coupling it to the output, and the process thus continues.

Referring to the second timing sequence, between $t_2$ and $t_3$ switch 22 is opened for applying one complete cycle of the high frequency component of the amplitude modulated waveform to the integrating network 11. During this sample period switches 28, 39 and 40 are closed for isolating network 11 from the buffer and discharge networks. The timing signals applied to switches 22, 28, 39 and 40 are shown in Graphs D, E and F in FIG. 3. The integration performed by network 11 is illustrated in Graph C of FIG. 4. At $t_3$ switch 22 is closed and switch 28 is opened so that during the holding period $t_3$ through $t_5$ the residual integrated quantity in network 11 is applied through buffer network 5 to the output terminal 31, the output being shown in Graph D of FIG. 4. At $t_5$ switch 28 is again closed and switches 39 and 40 are opened for discharging the network 11. The process repeats at $t_6$.

It is noted that the switches 21 and 22 are opened at the beginning of the negative going half cycles of the excitation frequency for each sample period, so as to provide integrated outputs having values corresponding in sign to the slope of the envelope of the applied waveform. As a related consideration, the suppressed carrier waveform contains both positive and negative sign of the amplitude modulation information in the phase of the high frequency component. On the other hand, with the carrier present unipolar amplitude modulation information will be processed only.

It may be appreciated that the described time sequences of switching events may be modified somewhat from that which has been described, without altering the basic rate demodulation process. For example, the sample periods can be started at the beginning of the positive going half cycles of the excitation frequency, which would merely provide a sign inversion in the output. The sample periods also can be extended to contain two or more integral cycles of the high frequency component. Further the holding and discharge periods may be of different lengths than those described.

What I claim as new and desire to secure by Letters Patent of the United States is:

1. An envelope rate demodulator for extracting the time rate of change of the envelope of an amplitude modulated waveform, comprising:

a. sampling means for sampling said amplitude modulated waveforms, each sample including an integral number of cycles, commencing at a zero crossover region, of the waveform's high frequency component, b. integrating means for generating electrical quantities that are proportional to the integrated values of said samples and provide a measure of the average time rate of change of the corresponding envelope segments, c. output means, and d. buffer means for sequentially applying said electrical quantities to said output means.

2. An envelope rate demodulator as in claim 1 wherein said sampling means comprises:

a. first switching means for selectively applying the amplitude modulated waveform to said integrating means during sample periods, b. second switching means for selectively coupling said integrating means to said buffer means during holding periods which follow said sample periods, c. a discharge network, and d. third switching means for selectively coupling said integrating means to said discharge network at the termination of said holding periods so as to ready said integrating means for subsequent samples.

3. An envelope demodulator as in claim 2 wherein:

a. said integrating means comprises first and second integrating networks, b. said first switching means includes a first switching device coupled to said first integrating network and a second switching device coupled to said second integrating network, c. said second switching means includes a third switching device coupling said first integrating network to said buffer means and a fourth switching device coupling said second integrating network to said buffer means, and d. said third switching means including a first pair of switching devices coupling said first integrating network to said discharge network and a second pair of switching devices coupling said second integrating network to said discharge network, said first device, first pair of devices and third device being operated in a first time sequence, and said second device, second pair of devices and fourth device being operated in a second time sequence out of phase with said first sequence so that said first and second integrating networks provide an alternate integration of said samples.

4. An envelope demodulator as in claim 3 which includes a source of timing signals and means for applying said timing signals to said switching devices.

5. An envelope demodulator as in claim 4 wherein said first and second integrating network, discharge network and buffer means are each in the form of an operational amplifier.

* * * * *